United States Patent Office 3,336,345
Patented Aug. 15, 1967

3,336,345
2 - {[(ESTRA - 1,3,5(10) - TRIEN - 3 - YL)OXY]LOWER ALKYL} - 2 - THIOPSEUDOUREA COMPOUNDS AND THEIR ACID ADDITION SALTS
David Eurof Evans, Knowle Hill, Virginia Water, England, assignor to Parke, Davis & Company, Detroit, Mich., a corporation of Michigan
No Drawing. Filed Dec. 17, 1965, Ser. No. 514,703
Claims priority, application Great Britain, Jan. 25, 1965, 3,268/65
6 Claims. (Cl. 260—397.4)

The present invention relates to new steroid compounds and to methods for their production. More particularly, it relates to new 2-{[(estra-1,3,5(10)-trien-3-yl)-oxyl]lower alkyl}-2-thiopseudourea compounds, having the formula

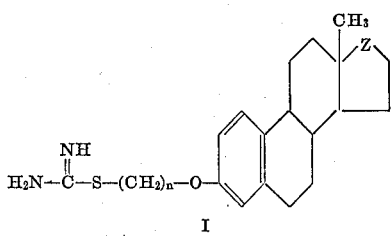

I and to pharmaceutically-acceptable acid-addition salts thereof; where $n$ is a positive integer greater than 1 and less than 11 and Z represents

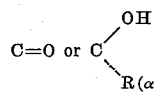

where $R(\alpha)$ is hydrogen, methyl, or ethynyl.

In accordance with the invention, compounds having Formula I above and acid-addition salts thereof are produced by reacting a 3-(ω-haloalkoxy)estra-1,3,5(10)-triene compound, having the formula

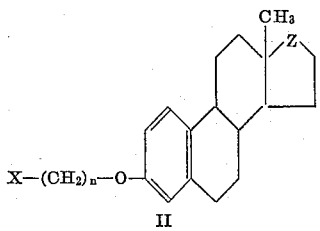

II with thiourea in a non-reactive solvent; where X is a halogen atom, preferably bromine, and $n$ and Z have the aforementioned significance. Suitable non-reactive solvents for the reaction are the lower alkanols, such as methanol, ethanol, propanol, and isopropyl alcohol, and mixtures of these with water. The temperature and duration of the reaction are not critical and may be varied over a wide range from room temperature for 24 to 48 hours to the reflux temperature of the reaction mixture for 1 to 4 hours. The reaction is most conveniently carried out at the reflux temperature for 2 to 3 hours. When the reaction is carried out at room temperature, it is preferable to employ a 3-(ω-Iodoalkoxy)estra-1,3,5(10)-triene compound, that is, a compound having Formula II wherein X represents iodine. Equimolar quantities of the reactants may be used. For optimum results, however, it is preferable to employ a substantial excess of thiourea. The products of the reaction are normally isolated in the form of an acid-addition salt. If desired, however, they may also be isolated in free base form by making the reaction product mixture alkaline and extracting the free base from the alkaline mixture.

The 3-(ω-haloalkoxy)estra-1,3,5(10)-triene compounds of Formula II used as starting materials in the foregoing process can be prepared by reacting a 3-hydroxyestra-1,3,5(10)-triene compound having the formula

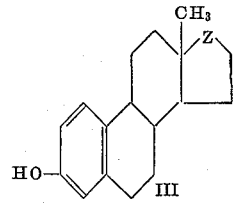

III with an α,ω-dihaloalkane of formula $$X—(CH_2)_n—X$$

in the presence of base in an alcoholic solvent; where $n$, X, and Z are as previously defined. The compounds of Formula II, where X represents an iodine atom, are preferably prepared by reacting the compounds of Formula II, where X is bromine or chlorine, with sodium iodide or potassium iodide in acetone or ethanol.

The compounds of the invention can exist in the free base form having Formula I or in the form of an acid-addition salt formed with a variety of inorganic or organic acids. Some representative non-toxic, pharmaceutically-acceptable acid-addition salts are the hydrochloride, hydrobromide, hydroiodide, sulfate, phosphate, citrate, acetate, tartrate, benzoate, benzenesulfonate, and p-toluenesulfonate. As stated above, the hydrohalide salts may be isolated directly from the reaction of the 3-(ω-haloalkoxy)estra-1,3,5(10)-triene compound having Formula II and thiourea; the particular salt obtained is dependent on the particular 3-(ω-haloalkoxy)-estra-1,3,5 (10)-triene employed. Other acid-addition salts, as well as the hydrohalide salts, are formed by reacting the selected isolated free base with the selected acid in an unreactive solvent. The acid-addition salts can be converted to the free base by reaction with a base such as an alkali metal carbonate or an alkali metal hydroxide. In view of their much greater stability, the acid-addition salts are the preferred compounds for purposes of the invention.

The compounds of the invention are useful pharmacological agents. They are hypocholesteremic agents that are active in lowering blood chlosterol levels. They are also anti-fertility agents. They are active upon oral administration.

Preferred compounds of the invention, by virtue of their high degree of hypocholesteremic activity, are the pharmaceutically-acceptable acid-addition salts of 2-{5'-[(17β-hydroxyestra-1,3,5(10)-trien - 3 - yl)oxyl]pentyl}-2-thiopseudourea compounds having the formula

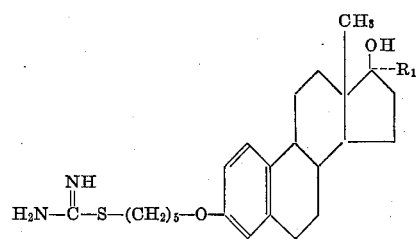

where $R_1$ is methyl or ethynyl.

The invention is illustrated by the following examples:

Example 1

A mixture consisting of 2.0 g. of 3-(γ-bromo-n-propoxy) estra-1,3,5(10)-trien-17-one, 1.0 g. of thiourea, and 70 ml. of 96% ethanol is heated under reflux for 2.5 hours. The solution is then concentrated to small volume under reduced pressure, diluted with ether, and the solid 2-{3'-[(17-oxoestra-1,3,5(10)-trien - 3 - yl)oxy]propyl}-2-thiopseudourea hydrobromide that is obtained is crystallized several times from ethanol; M.P. 235–239° C.

In the foregoing procedure, with the substitution of 2.0 g. of 3-(γ-chloro-n-propoxy)estra-1,3,5(10)-trien-17-one for the 3-(γ-bromo-n-propoxy)estra-1,3,5(10)-trien-17-one, there is obtained 2-{3'-[(17-oxoestra-1,3,5(10)-trien-3-yl)oxy]propyl}-2-thiopseudourea hydrochloride.

The free base, 2-{3'-[(17-oxoestra-1,3,5(10)-trien-3-yl)oxy]propyl}-2-thiopseudourea is obtained in the foregoing procedure by diluting the concentrated ethanolic reaction product mixture with water, treating the aqueous solution with aqueous sodium hydroxide until alkaline, extracting the alkaline mixture with ether, and evaporating the ether extract to dryness under reduced pressure.

By utilizing the foregoing procedure, the following 2-{[(17-oxoestra-1,3,5(10)-trien-3-yl)oxy]lower alkyl}-2-thiopseudourea compounds are obtained from the reaction of the specified 3-(ω-haloalkoxy)estra-1,3,5(10)-trien-17-one compound with thiourea:

(a) From the reaction of 3-(ω-bromo-n-pentyloxy)estra-1,3,5(10)-trien-17-one with thiourea there is obtained 2-{5'-[(17-oxoestra-1,3,5(10)-trien-3-yl)oxy]pentyl}-2-thiopseudourea hydrobromide; M.P. 199–201° C., following several crystallizations from ethanol.

(b) From the reaction of 3-(ω-bromo-n-decyloxy)estra-1,3,5(10)-trien-17-one with thiourea there is obtained 2-{10'-[(17-oxoestra-1,3,5(10)-trien - 3 - yl)oxy]decyl}-2-thiopseudourea hydrobromide; M.P. 163–167° C., following several crystallizations from ethanol.

The preparation of the 3-(ω-haloalkoxy)estra-1,3,5(10)-trien-17-one compounds used as starting materials in the foregoing procedure can be illustrated by the preparation of 3-(ω-bromo-n-pentyloxy)estra-1,3,5(10)-trien-17-one according to the following procedure.

A solution of 13.5 g. of estrone in a mixture of 150 ml. of ethanol and 10 ml. of 5 N potassium hydroxide is added, over a period of 2–3 hours, to a refluxing solution of 115 g. of 1,5-dibromopentane in 150 ml. of ethanol. After refluxing for an additional period of 1–2 hours, the reaction mixture is allowed to cool, is poured into water, and the product is extracted with benzene. The benzene solution is washed with water until neutral, and subjected to steam distillation to remove the unreacted steam-volatile 1,5-dibromopentane. The non-volatile residue is extracted once again with benzene, the benzene solution is washed first with a solution of 35 g. of potassium hydroxide in a mixture of 25 ml. of water and 100 ml. of methanol, then with water until netural. After drying over anhydrous magnesium sulfate, the benzene solution is evaporated to dryness and the 3-(ω-bromo-n-pentyloxy)estra-1,3,5(10)-trien-17-one obtained is recrystallized from methanol-ether; M.P. 84–86° C.

In this procedure, with the substitution of 1,5-dichloropentane for the 1,5-dibromopentane, there is obtained 3-(ω-chloro-n-pentyloxy)estra-1,3,5(10)-trien-17-one.

*Example 2*

A mixture consisting of 3.8 g. of 3-(ω-bromo-n-pentyloxy)-17α-methylestra-1,3,5(10)-trien-17β-ol, 1.9 g. of thiourea, and 150 ml. of 96% ethanol is heated under reflux for 2 hours. The solution is then concentrated to small volume under reduced pressure, diluted with ether, and the solid 2-{5'-[(17β-hydroxy-17α-methylestra-1,3,5 (10) - trien-3-yl)oxy]pentyl}-2-thiopseudourea hydrobromide that is obtained is crystallized several times from ethanol-ether; M.P. 196–200° C.

The free base, 2-{5'-[(17β-hydroxy-17α-methylestra-1,3,5(10) - trien-3-yl)oxy]pentyl}-2-thiopseudourea, is obtained by treating an aqueous solution of the hydrobromide salt with sufficient aqueous sodium carbonate to render it alkaline, extracting the alkaline mixture with ether, and evaporating the ether extract to dryness under reduced pressure.

The acetate salt of 2-{5'-[(17β-hydroxy-17α-methylestra-1,3,5(10)trien-3-yl)oxy]pentyl}-2-thiopseudourea is obtained by treating a solution of 0.5 g. of the free base in anhydrous ether with an ethereal solution containing 0.2 g. of glacial acetic acid, concentrating the resulting mixture, and isolating the precipitated salt by filtration.

The citrate salt is obtained in a similar manner by treating a methanolic solution of the free base with at least an equivalent amount of anhydrous citric acid.

The 3 - (ω-bromo-n-pentyloxy)-17α-methylestra-1,3,5 (10)-trien-17β-ol used as a starting material in the foregoing procedure is prepared according to the following procedure.

A solution of 57.5 g. of 1,5-dibromopentane in 70 ml. of 96% ethanol is heated under reflux while a solution containing 7.2 g. of 17α-methylestra-1,3,5(10)-trien-3, 17β-diol and 5 ml. of 5 N aqueous potassium hydroxide in 80 ml. of 96% ethanol is added during a period of one hour. The resulting solution is heated under reflux for an additional 90 minutes, then cooled, and poured into 1000 ml. of water. The aqueous mixture is extracted with benzene, and the benzene extract is washed, first with a solution prepared by dissolving 350 g. of potassium hydroxide in 250 ml. of water and diluting to 1000 ml. with methanol, then with water until neutral. After drying over anhydrous sodium sulfate, the benzene extract is evaporated to dryness, and the residual oil, dissolved in a minimum amount of benzene is purified by chromatography on an activated (activity grade III) alumina column. Elution of the column with benzene and evaporation of the benzene eluates yields the desired 3-(ω-bromo-n-pentyloxy)-17α-methylestra-1,3,5(10)-trien-17β-ol, isolated as an oil and used without further purification; [α]<sub>D</sub> +34° (1.03% in chloroform).

*Example 3*

A mixture consisting of 3.8 g. of 3-(ω-bromo-n-pentyloxy)-17α-ethynylestra-1,3,5(10)-trien-17β-ol, 1.9 g. of thiourea, and 150 ml. of 96% ethanol is heated under reflux for 2 hours. The solution is then concentrated to a small volume under reduced pressure, diluted with ether, and the solid 2-{5'-[(17β-hydroxy-17α-ethynylestra-1,3,5 (10) - trien-3-yl)oxy]pentyl}-2-thiopseudourea hydrobromide that is obtained is isolated and crystallized several times from ethanol-ether; M.P. 185–187° C., resolidifying and remelting at 212–214° C.

In the foregoing procedure, with the substitution of 3.8 g. of 3-(ω-bromo-n-decyloxy)-17α-ethynylestra-1,3,5(10)-trien-17β-ol for the 3-(ω-bromo-n-pentyloxy)-17α-ethynylestra-1,3,5(10)-trien-17β-ol, there is obtained 2-{10'-[(17β - hydroxy - 17α-ethynylestra-1,3,5(10)-trien-3-yl) oxy]decyl}-2-thiopseudourea hydrobromide; M.P. 154–155° C., following several crystallizations from ethanol-ether.

The 3 - (ω-bromo-n-pentyloxy)-17α-ethynylestra-1,3,5 (10)-trien-17β-ol, isolated as an oil, (α)<sub>D</sub> +8° (0.94% in chloroform), and 3-(ω-bromo-n-decyloxy)-17α-ethynylestra-1,3,5(10)-trien-17β-ol, M.P. 53° C., following crystallization from hexane, used as starting materials in the foregoing procedure are prepared in a manner analogous to that described in Example 2 above for the preparation of 3 - (ω - bromo-n-pentyloxy-17α-methylestra-1,3,5(10)-trien-17β-ol, employing 57.5 g. of 1,5-dibromopentane and 7.4 g. of 17α-ethynylestra-1,3,5(10)-trien-3,17β-diol in the first case and 75 g. of 1,10-dibromodecane and 7.4 g. of 17α-ethynylestra-1,3,5(10)-trien-3,17β-diol in the second case.

*Example 4*

A mixture consisting of 3.8 g. of 3-(ω-bromo-n-pentyloxy)estra-1,3,5(10)-trien-17β-ol, 1.9 g. of thiourea, and 150 ml. of 96% ethanol is heated under reflux for 2 hours. The solution is then concentrated under reduced pressure to a small volume and diluted with ether. The solid 2-{5'-[(17β - hydroxyestra-1,3,5(10)-trien-3-yl)oxy]pentyl}-2-thiopseudourea hydrobromide that is obtained is crystallized several times from ethanol-ether; M.P. 221–226° C.

The 3-(ω-bromo-n-pentyloxy)estra-1,3,5(10)-trien-17β- ol used as starting material in the foregoing procedure is prepared from the reaction of 57.5 g. of 1,5-dibromopentane, 6.8 g. of estra-1,3,5(10)-trien-3,17β-diol, and 5 ml. of 5 N aqueous potassium hydroxide according to the procedure described in Example 2 above for the preparation of 3-(ω-bromo-n-pentyloxy)-17α-methylestra-1,3,5(10)-trien-17β-ol.

I claim:

1. A member of the class consisting of a 2-{[(estra-1,3,5(10) - triene - 3-yl)oxyl]lower alky}-2-thiopseudourea compound having the formula

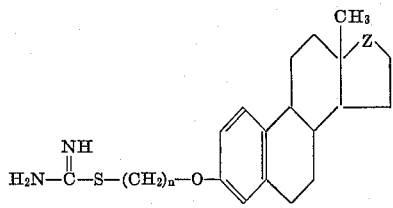

and pharmaceutically-acceptable acid-addition salts thereof; where $n$ is a positive integer greater than 1 and less than 11 and Z represents a member of the class consisting of

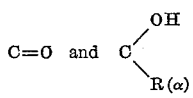

where R($\alpha$) is a member of the class consisting of hydrogen, methyl, and ethynyl.

2. A compound according to claim 1 which is a pharmaceutically-acceptable acid-addition salt.

3. A compound according to claim 1 which is 2-{5'-[(17 - oxoestra - 1,3,5(10) - trien-3-yl)oxy]pentyl}-2-thiopseudourea hydrobromide.

4. A compound according to claim 1 which is 2-{5'-[(17β - hydroxy - 17α - methylestra-1,3,5(10)-trien-3-yl)oxy]pentyl}-2-thiopseudourea hydrobromide.

5. A compound according to claim 1 which is 2-{5'-[(17β - hydroxy - 17α - ethynylestra-1,3,5(10)-trien-3-yl)oxy]pentyl}-2-thiopseudourea hydrobromide.

6. A compound according to claim 1 which is 2-{-10'-[(17β - hydroxy - 17α - ethynylestra-1,3,5(10)-trien-3-yl)oxy]decyl}-2-thiopseudourea hydrobromide.

References Cited

UNITED STATES PATENTS 2,547,366  4/1951  Bock et al. _____ 260—564
3,212,971  10/1965  Allais et al. _____ 167—65

LEWIS GOTTS, *Primary Examiner.*

T. M. MESHBESHER, *Assistant Examiner.*